(12) United States Patent
Atienza et al.

(10) Patent No.: US 11,041,034 B2
(45) Date of Patent: Jun. 22, 2021

(54) ETHYLENE-A-OLEFIN-DIENE ELASTOMERS AND METHODS OF MAKING THEM

(71) Applicant: ExxonMobil Chemical Patents Inc., Baytown, TX (US)

(72) Inventors: Crisita Carmen H. Atienza, Houston, TX (US); Rhutesh K. Shah, Katy, TX (US); Ron Walker, Pearland, TX (US); John R. Hagadorn, Houston, TX (US); Sudhin Datta, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 142 days.

(21) Appl. No.: 16/250,710

(22) Filed: Jan. 17, 2019

(65) Prior Publication Data

US 2019/0248935 A1  Aug. 15, 2019

Related U.S. Application Data

(60) Provisional application No. 62/628,420, filed on Feb. 9, 2018.

(51) Int. Cl.
*C08F 210/16* (2006.01)
*C08F 210/02* (2006.01)
(Continued)

(52) U.S. Cl.
CPC .......... *C08F 210/16* (2013.01); *B01J 31/183* (2013.01); *C08F 4/64113* (2013.01);
(Continued)

(58) Field of Classification Search
CPC .... C08F 210/16; C08F 210/02; C08F 210/06; C08F 236/04; C08F 4/64113; B01J 31/183; B01J 2231/12
See application file for complete search history.

(56) References Cited

U.S. PATENT DOCUMENTS 5,229,478 A   7/1993   Floyd et al.
5,698,651 A   12/1997  Kawasaki et al.
(Continued)

FOREIGN PATENT DOCUMENTS

EP   2221323   8/2010
EP   2115018   11/2011
(Continued)

OTHER PUBLICATIONS

Dullaert et al., "Quantitative Assessment of the Branching Architecture of EPDM with High Content of 5-vinyl-2-norbornene as Third Monomer," Rubber Chemistry and Technology, 2013, vol. 86, No. 4, pp. 503-520.

*Primary Examiner* — Catherine S Branch

(57) ABSTRACT

A process to produce a branched ethylene-α-olefin diene elastomer comprising combining a catalyst precursor and an activator with a feed comprising ethylene, C3 to C12 α-olefins, and a dual-polymerizable diene to obtain a branched ethylene-α-olefin diene elastomer; where the catalyst precursor is selected from pyridyldiamide and quinolinyldiamido transition metal complexes. The branched ethylene-α-olefin diene elastomer may comprise within a range from 40 to 80 wt % of ethylene-derived units by weight of the branched ethylene-α-olefin diene elastomer, and 0.1 to 2 wt % of singly-polymerizable diene derived units, 0.1 to 2 wt % of singly-polymerizable diene derived units, and the remainder comprising C3 to C12 α-olefin derived units, wherein the branched ethylene-α-olefin diene elastomer has a weight average molecular weight ($M_w$) within a range from 100 kg/mole to 300 kg/mole, an average branching index ($g'_{avg}$) of 0.9 or more, and a branching index at very high $M_w$ ($g'_{1000}$) of less than 0.9.

11 Claims, 4 Drawing Sheets

(51) Int. Cl.
*C08F 210/06* (2006.01)
*C08F 236/04* (2006.01)
*C08F 236/20* (2006.01)
*C08F 4/64* (2006.01)
*B01J 31/18* (2006.01)

(52) U.S. Cl.
CPC .......... *C08F 210/02* (2013.01); *C08F 210/06* (2013.01); *C08F 236/04* (2013.01); *C08F 236/20* (2013.01); *B01J 2231/12* (2013.01); *B01J 2531/49* (2013.01); *C08F 2800/20* (2013.01)

(56) References Cited

U.S. PATENT DOCUMENTS

| | | | |
|---|---|---|---|
| 6,124,413 A | 9/2000 | Banzi et al. | |
| 6,329,477 B1 | 12/2001 | Harrington et al. | |
| 6,545,088 B1 | 4/2003 | Kolthammer et al. | |
| 7,511,106 B2 | 3/2009 | Ravishankar | |
| 7,829,645 B2 | 11/2010 | Windmuller et al. | |
| 7,956,140 B2 | 6/2011 | Ijpeij et al. | |
| 8,013,082 B2 | 9/2011 | Ramage et al. | |
| 8,058,373 B2 | 11/2011 | Stevens et al. | |
| 8,710,163 B2 | 4/2014 | Hagadorn et al. | 526/172 |
| 8,962,761 B2 | 2/2015 | Tse | |
| 9,315,605 B2 | 9/2016 | Lee et al. | |
| 9,574,033 B1 | 2/2017 | Tang et al. | C08F 210/18 |
| 10,208,140 B2 | 2/2019 | Hagadorn et al. | C08F 10/06 |
| 10,457,801 B2 | 10/2019 | Canich et al. | C08L 23/16 |
| 2014/0221587 A1 | 8/2014 | Hagadorn et al. | C08F 210/06 |
| 2015/0141590 A1 | 5/2015 | Hagadorn et al. | C08F 210/16 |
| 2018/0201698 A1 | 7/2018 | Hagadorn et al. | C08F 4/65927 |
| 2019/0144653 A1* | 5/2019 | Tsou | C08F 210/18 525/232 |

FOREIGN PATENT DOCUMENTS

| | | | |
|---|---|---|---|
| JP | H0948823 | 2/1997 | |
| JP | H1160841 | 3/1999 | |
| WO | 95/16716 | 6/1995 | |
| WO | 97/32946 | 9/1997 | |
| WO | WO1999/000434 | 1/1999 | C08F 210/18 |
| WO | 2005/005496 | 1/2005 | |
| WO | 2008/095687 | 8/2008 | |
| WO | WO2010/011435 | 1/2010 | C01F 19/00 |
| WO | 2010/012587 | 2/2010 | |
| WO | WO2014/059019 | 4/2014 | C08F 210/06 |
| WO | 2017/048448 | 3/2017 | |

\* cited by examiner

ETHYLENE-A-OLEFIN-DIENE ELASTOMERS AND METHODS OF MAKING THEM

PRIORITY CLAIM

This application claims the benefit of priority from U.S. Provisional Application No. 62/628,420, filed Feb. 9, 2018, which is incorporated herein by reference.

FIELD OF THE INVENTION

The present invention(s) relate in general to ethylene-α-olefin diene elastomers and methods of making them, and more particularly to branched ethylene-α-olefin diene elastomers and a process to make them using pyridyldiamido and quinolinyldiamido transition metal complexes in a solution polymerization process.

BACKGROUND

The dual-polymerizable diene 5-vinyl-2-norbornene (VNB) is used in the production of ethylene-propylene-diene elastomer (EPDM) for peroxide curing and can also be utilized to prepare long-chain branched EPDM (b-EPDM). A major challenge in the production of b-EPDM is gel formation, which results from the high reactivity of the vinyl group in the VNB.

To mitigate gelation, a catalyst must have high endocyclic alkene/vinyl selectivity which minimizes hyperbranching via insertion of the pendant vinyl. Using high-throughput experimentation, the inventors have identified unique catalysts as suitable catalysts and methods for polymerization using VNB as a comonomer.

Relevant publications include U.S. Pat. Nos. 8,962,761; 8,058,373; 8,013,082; 7,956,140; 7,829,645; 7,511,106; 6,545,088; 6,329,477; 6,124,413; 5,698,651; 5,229,478; EP 2221323A1; EP 2115018A1; JP H1160841; JP 09048823; WO 2017/048448; WO 2011/002199; WO 2010/012587; WO 2005/005496; WO 2008/095687; WO 97/32946; and WO 95/16716.

SUMMARY

Disclosed is a process to produce a branched ethylene-α-olefin diene elastomer (b-EDE) comprising (or consisting essentially of, or consisting of) combining a catalyst precursor and an activator with a feed comprising ethylene, C3 to C12 α-olefins, and a dual-polymerizable diene to obtain a b-EDE; where the catalyst precursor is selected from pyridyldiamide and quinolinyldiamido transition metal complexes.

Also disclosed is a branched ethylene-α-olefin diene elastomer (b-EDE) comprising (or consisting of, or consisting essentially of) within a range from 40, or 45 to 65, or 70, or 75, or 80 wt % of ethylene-derived units by weight of the b-EDE, and 0.1 to 0.8, or 1, or 1.4, or 1.8, or 2 wt % of singly-polymerizable diene derived units by weight of the b-EDE, within a range from 0.1 to 0.5, or 0.8, or 1, or 1.4, or 1.8, or 2 wt % of a singly-polymerizable diene derived units by weight of the b-EDE, and the remainder comprising C3 to C12 α-olefin derived units (preferably propylene derived units), wherein the b-EDE has a weight average molecular weight (Mw) within a range from 100 kg/mole to 200, or 240, or 280, or 300, or 400, or 600, or 750 kg/mole, and wherein the b-EDE has a $g'_{avg}$ of 0.90 or more, and a $g'_{1000}$ of less than 0.9, or 0.85, or 0.8 (or within a range from 0.4, or 0.6, or 0.65 to 0.8 or 0.85 or 0.9).

DETAILED DESCRIPTION

Figure 1:
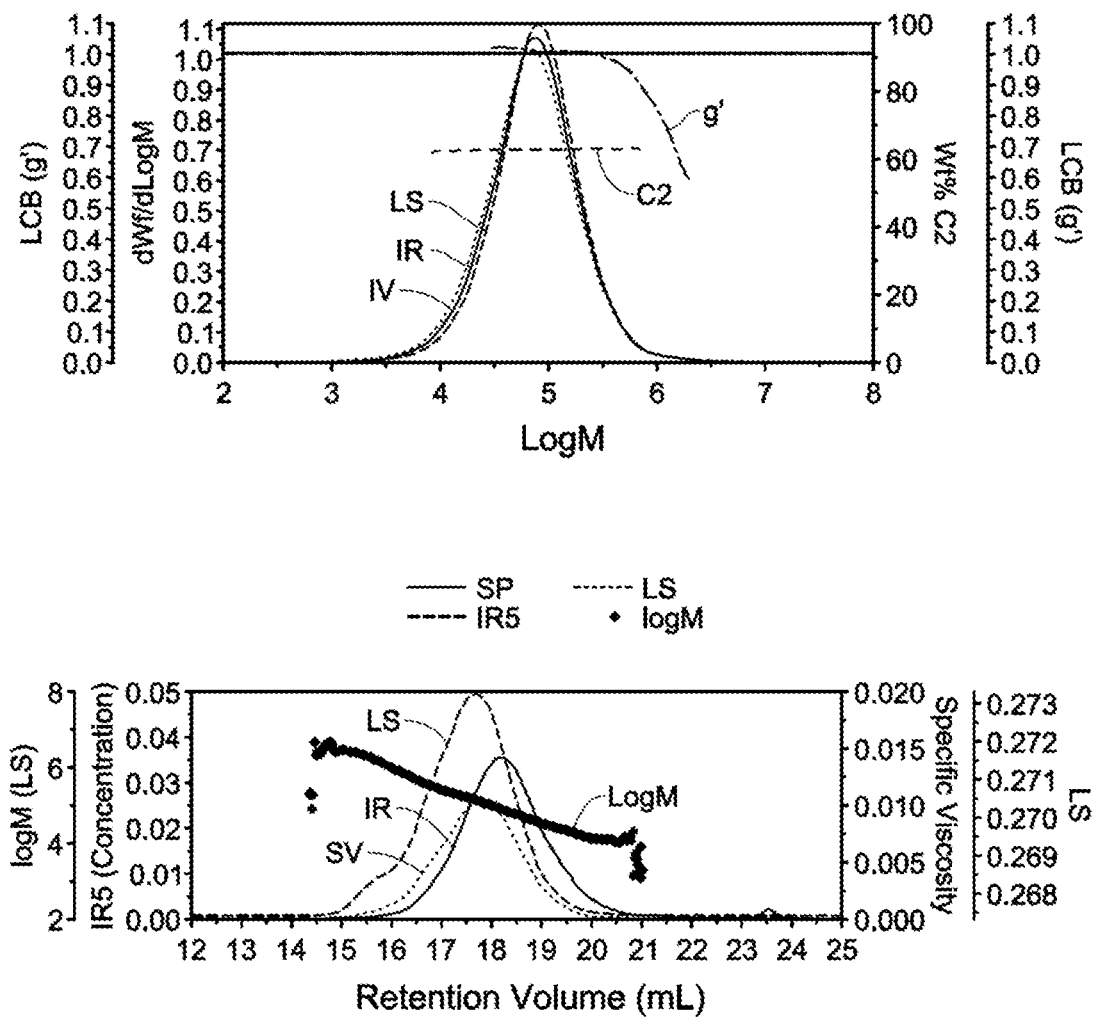
FIG. 1 is a gel permeation chromatogram and mass balance of inventive branched ethylene-α-olefin diene elastomer of Sample 3.

The pyridyldiamido and quinolinyldiamido transition metal complexes described herein were tested for terpolymerization capability at increasing VNB feed rates and a target ethylene content of approximately 60%. Analytical techniques such as gel permeation chromatograph (GPC), dynamic shear rheology, and extensional viscosity analyses of the resulting polymers were all consistent with higher long-chain branching (LCB) levels as the VNB content was increased. Performing the same experiments with ENB as the diene resulted in, for instance, 0.8 wt % ENB incorporation, indicating that approximately 75% of the vinyl group of VNB in the polymer was reacted to form long chain branches. GPC-4D analysis of the VNB-EPDM samples resulted in 100% recovery, which suggested negligible gel content in the material. However, in-reactor gel was obtained upon opening the reactor, albeit at a lower amount compared with those observed using metallocene-type polymerization catalysts. Thus, the inventors have found an improved method of forming ethylene-α-olefin diene elastomers, as set forth more particularly herein.

In any embodiment, the "dual-polymerizable dienes" are diene monomers selected from vinyl substituted strained bicyclic and unconjugated dienes, and alpha-omega linear dienes where both sites of unsaturation are polymerizable by a polymerization catalyst (e.g., Ziegler-Natta, vanadium, metallocene, etc.); and more preferably from vinyl norbornenes and C7 to C12 alpha-omega linear dienes (e.g., 1,7-heptadiene and 1,9-decadiene), and is most preferably 5-vinyl-2-norbornene (VNB). The b-EDE formed therefrom comprises "dual-polymerizable diene derived monomer units".

In any embodiment, the "singly-polymerizable dienes" are diene monomers in which only one of the double bonds is activated by a polymerization catalyst and is selected from cyclic and linear alkylenes, non-limiting examples of which include an unconjugated diene (and other structures where each double bond is two carbons away from the other), 5-ethylidene-2-norbornene, 4-vinylcyclohexeneand other strained bicyclic and unconjugated dienes, and dicyclopentadiene. More preferably, the singly-polymerizable diene is selected from C7 to C30 cyclic singly-polymerizable dienes. Most preferably the singly-polymerizable diene is 5-ethylidene-2-norbornene (ENB). The b-EDE formed therefrom comprises "singly-polymerizable diene derived monomer units".

In any embodiment, a "branched" ethylene-α-olefin diene elastomer (b-EDE) has a branching index value at a molecular weight of 1×10$^6$ g/mol, g'$_{1000}$, of less than or equal to 0.860 as calculated using the output of the GPC-IR5-LS-VIS method as follows. The average intrinsic viscosity, $[\eta_{avg}]$, of the sample is calculated by:

$$[\eta]_{avg} = \frac{\sum c_i[\eta]_i}{\sum c_i},$$

where the summations are over the chromatographic slices, "i", between the integration limits. The branching index g'$_{avg}$ is defined as:

$$g'_{avg} = \frac{[\eta]_{avg}}{kM_v^\alpha}.$$

In any embodiment, the branched polymer has minimal gel content. As used herein, the "gel content" refers to an insoluble portion (in hydrocarbon solvent) of polymer determined by extraction of a sample of the b-EDE in a hydrocarbon solvent such as cyclohexane, toluene or isohexane, which are typically used to dissolve b-EDE. In any embodiment, the gel content of the inventive b-EDE is less than 5, or 1, or 0.1 wt %.

In any embodiment, the "pyridyldiamido and quinolinyl-diamido transition metal complexes" include organometallic complexes of a transition metal ion, especially titanium, zirconium or hafnium, with one or more ligands that include at least one pyridyl and/or quinolinyl group and at least two other alkylamine ligands, and at least one leaving group, preferably a halogen or alkyl group, that is reactive towards the appropriate boron and/or aluminum-based activator.

In any embodiment, the pyridyldiamido and quinolinyl-diamido transition metal complexes are selected from one of the following structures:

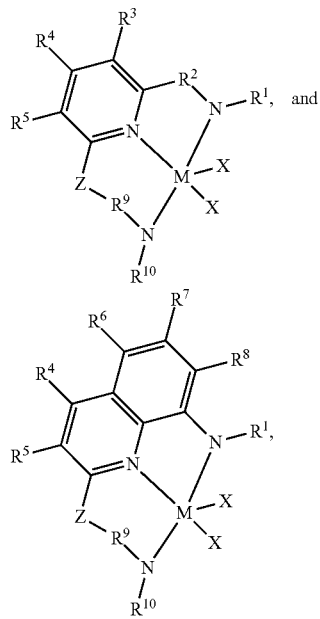

wherein M is titanium, hafnium or zirconium, most preferably hafnium;

R$^1$ and R$^{10}$ are independently selected from the group consisting of hydrocarbyls (such as alkyls, aryls), substituted hydrocarbyls (substituents pendant to the hydrocarbyl), heterohydrocarbyls (non-carbon atoms within the hydrocarbyl), and silyl groups; most preferably R$^1$ and R$^{10}$ comprise an aniline structure that may be substituted with C1 to C5 alkyls;

R$^2$ and R$^9$ are each, independently, divalent hydrocarbyls or a chemical bond;

R$^3$, R$^4$, R$^5$, R$^6$, R$^7$, and R$^8$ are independently selected from the group consisting of hydrogen, hydrocarbyls (e.g., alkyls and aryls), substituted hydrocarbyls (e.g., heteroaryl), alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings;

X is an anionic leaving group, where the X groups may be the same or different and any two X groups may be linked to form a dianionic leaving group; and Z is —(R$^{11}$)$_p$QJ(R$^{12}$)$_q$—, wherein Q is carbon, oxygen, nitrogen, or silicon (preferably nitrogen), and where J is carbon or silicon (preferably carbon), p is 1 or 2; and q is 1 or 2; and R$^{11}$ and R$^{12}$ are independently selected from the group consisting of hydrogen, hydrocarbyls (preferably alkyls), and substituted hydrocarbyls, and wherein adjacent R$^{11}$ and R$^{12}$ groups may be joined to form an aromatic or saturated, substituted or unsubstituted hydrocarbyl ring, where the ring has 5, 6, 7, or 8 ring carbon atoms and where substitutions on the ring can join to form additional rings; most preferably Z forms a bicyclic hydrocarbyl comprising a C6 cyclic portion and a C4 to C6 cyclic portion, where an example of Z is a divalent tetrahydroindenyl or divalent tetrahydronaphthalene.

In any embodiment, the pyridyldiamido and quinolinyl-diamido transition metal complexes are selected from one of the following structures:

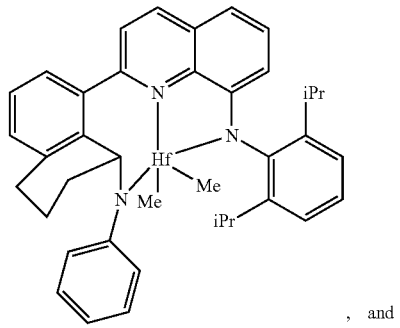

, and

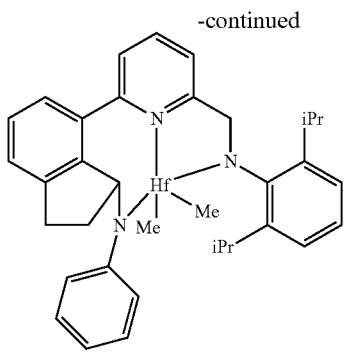

, wherein the "Me" represents "methyl" and "iPr" represents "iso-propyl", and wherein these groups could also variously be any C1 to C10 alkyl (normal, iso, and/or tertiary), and the saturated ring may variously be a 4 to 6 membered ring, interchangeably between the two structures.

Thus in any embodiment is a process to produce a branched ethylene-α-olefin diene elastomer (b-EDE) comprising (or consisting essentially of, or consisting of) combining a catalyst precursor and an activator with a feed comprising ethylene, C3 to C12 α-olefins, and a dual-polymerizable diene to obtain a b-EDE; where the catalyst precursor is selected from pyridyldiamide and quinolinyl-diamido transition metal complexes.

The catalyst or catalyst precursor must also be combined with at least one "activator" to effect polymerization of the cyclic olefin monomers and ethylene, wherein the activator preferably comprises a non-coordinating borate anion and a bulky organic cation. In any embodiment, the non-coordinating borate anion comprises a tetra(perfluorinated C6 to C14 aryl)borate anion and substituted versions thereof; most preferably the non-coordinating borate anion comprises a tetra(pentafluorophenyl)borate anion or tetra(perfluoronaphthyl)borate anion.

Preferably the bulky organic cation is selected from the following structures (a) and (b):

wherein each R group is independently hydrogen, a C6 to C14 aryl (e.g., phenyl, naphthyl, etc.), a C1 to C10 or C20 alkyl, or substituted versions thereof; and more preferably at least one R group is an C6 to C14 aryl or substituted versions thereof.

In any embodiment, the bulky organic cation is a reducible Lewis Acid, especially a trityl-type cation (wherein each "R" group in (a) is aryl) capable of extracting a ligand from the catalyst precursor, where each "R" group is an C6 to C14 aryl group (phenyl, naphthyl, etc.) or substituted C6 to C14 aryl, and preferably the reducible Lewis acid is triphenyl carbenium and substituted versions thereof.

Also, in any embodiment, the bulky organic cation is a Brønsted acid capable of donating a proton to the catalyst precursor, wherein at least one "R" group in (b) is hydrogen. Exemplary bulky organic cations of this type in general include ammoniums, oxoniums, phosphoniums, silyliums, and mixtures thereof; preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, and p-nitro-N,N-dimethylaniline; phosphoniums from triethylphosphine, triphenylphosphine, and diphenylphosphine; oxoniums from ethers, such as dimethyl ether diethyl ether, tetrahydrofuran, and dioxane; and sulfoniums from thioethers, such as diethyl thioethers and tetrahydrothiophene, and mixtures thereof.

The catalyst precursor preferably reacts with the activator upon their combination to form a "catalyst" or "activated catalyst" that can then effect the polymerization of monomers. The catalyst may be formed before combining with monomers, after combining with monomers, or simultaneous therewith.

In any embodiment, the combining takes place at a temperature within a range from 80, or 90° C. to 120, or 140, or 160° C. and a pressure within a range from 0.5 MPa to 4, or 6, or 8 MPa. Most preferably the combining in a solution process, meaning that all components in the polymerization are soluble in the medium (diluent and/or monomers) or at least 80, or 90 wt % of the components are soluble and dissolved in the medium.

In any embodiment, the solution process can be carried out in one or more single-phase, liquid-filled, stirred tank reactor with continuous flow of feeds to the system and continuous withdrawal of products under steady state conditions. When more than one reactor is used, the reactors may be operated in a serial or parallel configuration making essentially the same or different polymer components. Advantageously, the reactors would produce polymers with different properties, such as different molecular weights, or different monomer compositions, or different levels of long-chain branching, or any combinations thereof. All polymerizations can be performed in a system with a solvent comprising any one or more of C4 to C12 alkanes, using soluble metallocene catalysts or other single-site catalysts and discrete, non-coordinating borate anion as co-catalysts. A homogeneous dilute solution of tri-n-octyl aluminum or other aluminum alkyl in a suitable solvent may be used as a scavenger in concentrations appropriate to maintain reaction. Chain transfer agents, such as hydrogen, can be added to control molecular weight. Polymerizations can be at high temperatures described above and high conversions to maximize macromer re-insertions that create long chain branching, if so desired. This combination of a homogeneous, continuous, solution process helped to ensure that the products had narrow composition and sequence distributions.

In any embodiment the process also comprises further combining a singly-polymerizable diene. Also in any embodiment the α-olefins comprise (or consist of) propylene. Finally, hydrogen is preferably present to less than 5, or 1, or 0.8, or 0.4, or 0.2 sccm (standard cubic centimeter per min.) from the feed; and most preferably hydrogen is absent from the feed. When referring to the "feed", this components that are combined include only those substances in the feed.

Produced from the process is a branched ethylene-α-olefin diene elastomer (b-EDE) comprising (or consisting of, or consisting essentially of) within a range from 40, or 45 to 65, or 70, or 75, or 80 wt % of ethylene-derived units by weight of the b-EDE, 0.1 to 0.8, or 1, or 1.4, or 1.8, or 2 wt % of singly-polymerizable diene derived units by weight of the b-EDE, within a range from 0.1 to 0.5, or 0.8, or 1, or 1.4, or 1.8, or 2 wt % of a singly-polymerizable diene derived units by weight of the b-EDE, and the remainder comprising C3 to C12 α-olefin derived units (preferably propylene derived units), wherein the b-EDE has a weight average molecular weight (Mw) within a range from 100 kg/mole to 200, or 240, or 280, or 300, or 400, or 600, or 750 kg/mole, and wherein the b-EDE has a $g'_{avg}$ of 0.9 or more, and a $g'_{1000}$ of less than 0.9, or 0.85, or 0.8 (or within a range from 0.4, or 0.6, or 0.65 to 0.8 or 0.85 or 0.9).

The inventive b-EDEs may be useful in any number of applications such as rubber profiles (like automotive solid and sponge profiles, building profiles), hoses, mechanical goods, films (cast and/or blown) and sheets of material, such as for roofing applications, as well as thermoformed articles, blow molded articles, rotomolded articles, and injection molded articles. Particularly desirable end uses include automotive components and gaskets. Any of these articles may be foamed articles which are formed by means known in the art. Foamed or not, some specific uses of the inventive b-EDEs include weather stripping, heat insulation, opening trim, and car trunk or car hood seals.

The various descriptive elements and numerical ranges disclosed herein for the inventive process and b-EDE therefrom can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

The synthesis of the catalyst precursor is described here, as well as the polymerization examples.

Proton ($^1$H) Nuclear Magnetic Resonance Catalyst characterization was accomplished using proton NMR, wherein the $^1$H NMR data was collected at 23° C. in a 5 mm probe using a Varian spectrometer with a $^1$H frequency of at least 400 MHz. Data was recorded using a maximum pulse width of 45°, 8 sec between pulses and signal averaging 120 transients. All NMR spectra were referenced using the peak corresponding to the deuterated solvent.

Starting Reagents Sodium hydride (NaH), 8-bromoquinolin-2(1H)-one, t-butyldimethylsilylchloride, n-butyllithium, t-butyllithium, Pd$_2$(dba)$_3$, 2-Dicyclohexylphosphino-2',4',6'-triisopropylbiphenyl (XPhos), K$_2$CO$_3$, dichloromethane, methanol, POCl$_3$, n-hexane, 1,2,3,4-tetrahydronaphthalen-1-ol, N,N,N',N'-tetramethylethylenediamine (TMEDA), pentane, 1,2-dibromotetrafluoroethane, Na$_2$SO$_4$, triethylamine, acetic anhydride, 4-(dimethylamino)pydridine (DMAP), ethyl acetate, Na$_2$CO$_3$, potassium hydroxide (KOH), pyridinium chlorochromate (PCC), aniline, toluene, TiCl$_4$, NaBH$_3$CN, acetic acid, CDCl$_3$, 2-isopropoxy-4,4,5,5-tetramethyl-1,3,2-dioxaborolane, 1,4-dioxane, cesium carbonate, Pd(PPh$_3$)$_4$, benzene, Hf(NMe$_2$)$_4$, Me$_3$Al, 6-bromopyridine-2-carboxaldehyde, 2,6-diisopropylaniline, indan-1-ol and 2-isopropoxy-4,4,5,5-tetramethyl-1,3,2-dioxaborolane were purchased from commercial sources and used as received. Hf(NMe$_2$)$_2$Cl$_2$, 1,2-dimethoxyethane (DME), and dimethylmagnesium were prepared following published procedures (Erker et al., in 19 ORGANOMETALLICS 127 (2000); Coates and Heslop, in J. CHEM. SOC. A 514 (1968); Andersen et al., in J. CHEM. SOC., DALTON TRANS. 809 (1977)). Tetrahydrofuran (THF, Merck) and diethyl ether (Merck) were freshly distilled from benzophenone ketyl were used for organometallic synthesis and catalysis.

8-(2,6-Diisopropylphenylamino)quinolin-2(1H)-one To a suspension of NaH (5.63 g of 60 wt % in mineral oil, 140 mmol) in tetrahydrofuran (1000 mL) was added 8-bromoquinolin-2(1H)-one (30.0 g, 134 mmol) in small portions at 0° C. The obtained reaction mixture was warmed to 23° C. (room temperature), stirred for 30 min, then cooled to 0° C. Then t-butyldimethylsilylchloride (20.2 g, 134 mmol) was added in one portion. This mixture was stirred for 30 min at 23° C. and then poured into water (1 L). The protected 8-bromoquinolin-2(1H)-one was extracted with diethyl ether (3×400 mL). The combined extracts were dried over Na$_2$SO$_4$ and then evaporated to dryness. Yield 45.2 g (quant., 99% purity by GC/MS) of a dark red oil. To a solution of 2,6-diisopropylaniline (27.7 mL, 147 mmol) and toluene (1.5 L) was added n-butyllithium (60.5 mL, 147 mmol, 2.5 M in hexanes) at 23° C. The obtained suspension was heated briefly to 100° C. and then cooled to 23° C. To the reaction mixture was added Pd$_2$(dba)$_3$ (dba=dibenzylideneacetone) (2.45 g, 2.68 mmol) and XPhos (2.55 g, 5.36 mmol) followed by the addition of the protected 8-bromoquinolin-2(1H)-one (45.2 g, 134 mmol). The obtained dark brown suspension was heated at 60° C. until lithium salt precipitate disappeared (ca. 30 min). The resulting dark red solution was quenched by addition of water (100 mL), and the organic layer was separated, dried over Na$_2$SO$_4$ and then evaporated to dryness. The obtained oil was dissolved in a mixture of dichloromethane (1000 mL) and methanol (500 mL), followed by an addition of 12 M HCl (50 mL). The reaction mixture was stirred at 23° C. for 3 hr., then poured into 5% K$_2$CO$_3$ (2 L). The product was extracted with dichloromethane (3×700 mL). The combined extracts were dried over Na$_2$SO$_4$, filtered, and then evaporated to dryness. The resulting solid was triturated with n-hexane (300 mL), and the obtained suspension collected on a glass frit. The precipitate was dried in vacuum. Yield 29.0 g (67%) of a marsh-green solid. Anal. calc. for C$_{21}$H$_{24}$N$_2$O: C, 78.71; H, 7.55; N, 8.74. Found: C, 79.00; H, 7.78; N, 8.50. $^1$H NMR (CDCl$_3$): δ 13.29 (br.s, 1H), 7.80-7.81 (d, 1H, J=9.5 Hz), 7.35-7.38 (m, 1H), 7.29-7.30 (m, 3H), 6.91-6.95 (m, 2H), 6.58-6.60 (d, 1H, J=9.5 Hz), 6.27-6.29 (m, 1H), 3.21 (sept, 2H, J=6.9 Hz), 1.25-1.26 (d, 6H, J=6.9 Hz), 1.11-1.12 (d, 6H, J=6.9 Hz).

2-Chloro-N-(2,6-diisopropylphenyl)quinolin-8-amine 29.0 g (90.6 mmol) of 8-(2,6-diisopropylphenylamino)quinolin-2(1H)-one was added to 400 mL of POCl$_3$ in one portion. The resulting suspension was heated for 40 hrs. at 105° C., then cooled to 23° C., and poured into 4000 cm$^3$ of a crushed ice. The crude product was extracted with 3×400 mL of diethyl ether. The combined extract was dried over K$_2$CO$_3$ and then evaporated to dryness. The resulting solid was triturated with 30 mL of cold n-hexane, and the formed suspension was collected on a glass frit. The obtained solid was dried in vacuum. Yield 29.0 g (95%) of a yellow-green solid. Anal. calc. for C$_{21}$H$_{23}$N$_2$Cl: C, 74.43; H, 6.84; N, 8.27. Found: C, 74.68; H, 7.02; N, 7.99. $^1$H NMR (CDCl$_3$): δ 8.04-8.05 (d, 1H, J=8.6 Hz), 7.38-7.39 (d, 1H, J=8.5 Hz), 7.33-7.36 (m, 1H), 7.22-7.27 (m, 4H), 7.04-7.06 (d, 1H, J=8.1 Hz), 6.27-6.29 (d, 1H, J=7.8 Hz), 3.20 (sept, 2H, J=6.9 Hz), 1.19-1.20 (d, 6H, J=6.9 Hz), 1.10-1.11 (d, 6H, J=6.9 Hz).

8-Bromo-1,2,3,4-tetrahydronaphthalen-1-ol To a mixture of 78.5 g (530 mmol) of 1,2,3,4-tetrahydronaphthalen-1-ol, 160 mL (1.06 mol) of N,N,N',N'-tetramethylethylenediamine, and 3000 mL of pentane cooled to −20° C. 435 mL (1.09 mol) of 2.5 M nBuLi in hexanes was added dropwise. The obtained mixture was refluxed for 12 hrs. then cooled to −80° C., and 160 mL (1.33 mol) of 1,2-dibromotetrafluoroethane was added. The obtained mixture was allowed to warm to 23° C. and then stirred for 12 hrs. at this temperature. After that, 100 mL of water was added. The resulting mixture was diluted with 2000 mL of water, and the organic layer was separated. The aqueous layer was extracted with 3×400 mL of toluene. The combined organic extract was dried over $Na_2SO_4$ and then evaporated to dryness. The residue was distilled using the Kugelrohr apparatus, b.p. 150-160° C./1 mbar. The obtained yellow oil was dissolved in 100 mL of triethylamine, and the formed solution was added dropwise to a stirred solution of 71.0 mL (750 mmol) of acetic anhydride and 3.00 g (25.0 mmol) of 4-dimethylaminopyridine in 105 mL of triethylamine. The formed mixture was stirred for 5 min, then 1000 mL of water was added, and the obtained mixture was stirred for 12 hrs. After that, the reaction mixture was extracted with 3×200 mL of ethyl acetate. The combined organic extract was washed with aqueous $Na_2CO_3$, dried over $Na_2SO_4$, and then evaporated to dryness. The residue was purified by flash chromatography on silica gel 60 (40-63 μm, eluent: hexane-ethyl acetate=30:1, vol.). The isolated ester was dissolved in 1500 mL of methanol, 81.0 g (1.45 mol) of KOH was added, and the obtained mixture was heated to reflux for 3 hrs. The reaction mixture was then cooled to 23° C. and poured into 4000 mL of water. The title product was extracted with 3×300 mL of dichloromethane. The combined organic extract was dried over $Na_2SO_4$ and then evaporated to dryness. Yield 56.0 g (47%) of a white crystalline solid. $^1$H NMR (CDCl$_3$): δ 7.38-7.41 (m, 1H, 7-H); 7.03-7.10 (m, 2H, 5,6-H); 5.00 (m, 1H, 1-H), 2.81-2.87 (m, 1H, 4/4'-H); 2.70-2.74 (m, 1H, 4'/4-H), 2.56 (br.s., 1H, OH), 2.17-2.21 (m, 2H, 2,2'-H), 1.74-1.79 (m, 2H, 3,3'-H).

8-Bromo-3,4-dihydronaphthalen-1(2H)-one To a solution of 56.0 g (250 mmol) of 8-bromo-1,2,3,4-tetrahydronaphthalen-1-ol in 3500 mL of dichloromethane was added 265 g (1.23 mol) of pyridinium chlorochromate (PCC). The resulting mixture was stirred for 5 hrs. at 23° C., then passed through a pad of silica gel 60 (500 mL; 40-63 μm), and finally evaporated to dryness. Yield 47.6 g (88%) of a colorless solid. $^1$H NMR (CDCl$_3$): δ 7.53 (m, 1H, 7-H); 7.18-7.22 (m, 2H, 5,6-H); 2.95 (t, J=6.1 Hz, 2H, 4,4'-H); 2.67 (t, J=6.6 Hz, 2H, 2,2'-H); 2.08 (quint, J=6.1 Hz, J=6.6 Hz, 2H, 3,3'-H).

(8-Bromo-1,2,3,4-tetrahydronaphthalen-1-yl)phenylamine To a stirred solution of 21.6 g (232 mmol) of aniline in 140 mL of toluene was added 10.93 g (57.6 mmol) of TiCl$_4$ over 30 min at 23° C. under argon atmosphere. The resulting mixture was stirred for 30 min at 90° C. followed by an addition of 13.1 g (57.6 mmol) of 8-bromo-3,4-dihydronaphthalen-1(2H)-one. This mixture was stirred for 10 min at 90° C., then cooled to 23° C., and poured into 500 mL of water. The product was extracted with 3×50 mL of ethyl acetate. The combined organic extract was dried over $Na_2SO_4$, evaporated to dryness, and the residue was re-crystallized from 10 mL of ethyl acetate. The obtained crystalline solid was dissolved in 200 mL of methanol, 7.43 g (118 mmol) of NaBH$_3$CN and 3 mL of acetic acid were added in argon atmosphere. This mixture was heated to reflux for 3 h, then cooled to 23° C., and evaporated to dryness. The residue was diluted with 200 mL of water, and crude product was extracted with 3×100 mL of ethyl acetate. The combined organic extract was dried over $Na_2SO_4$ and evaporated to dryness. The residue was purified by flash chromatography on silica gel 60 (40-63 μm, eluent: hexane-ethyl acetate-triethylamine=100:10:1, vol.). Yield 13.0 g (75%) of a yellow oil. Anal. Calc. for $C_{16}H_{16}BrN$: C, 63.59; H, 5.34;

N, 4.63. Found: C, 63.82; H, 5.59; N, 4.49. $^1$H NMR (CDCl$_3$): δ 7.44 (m, 1H), 7.21 (m, 2H), 7.05-7.11 (m, 2H), 6.68-6.73 (m, 3H), 4.74 (m, 1H), 3.68 (br.s, 1H, NH), 2.84-2.89 (m, 1H), 2.70-2.79 (m, 1H), 2.28-2.32 (m, 1H), 1.85-1.96 (m, 1H), 1.76-1.80 (m, 1H), 1.58-1.66 (m, 1H).

N-Phenyl-8-(4,4,5,5-tetramethyl-1,3,2-dioxaborolan-2-yl)-1,2,3,4-tetrahydronaphthalen-1-amine To a solution of 13.0 g (43.2 mmol) of (8-bromo-1,2,3,4-tetrahydronaphthalen-1-yl)phenylamine in 250 mL tetrahydrofuran (THF) was added 17.2 mL (43.0 mmol) of 2.5 M $^n$BuLi at −80° C. Further on, this mixture was stirred for 1 hr. at this temperature, and 56.0 mL (90.3 mmol) of 1.6 M $^t$BuLi in pentane was added. The resulting mixture was stirred for 1 hr. at the same temperature. Then, 16.7 g (90.0 mmol) of 2-isopropoxy-4,4,5,5-tetramethyl-1,3,2-dioxaborolane was added. After that the cooling bath was removed, and the resulting mixture was stirred for 1 hr. at 23° C. Finally, 10 mL of water was added, and the obtained mixture was evaporated to dryness. The residue was diluted with 200 mL of water, and crude product was extracted with 3×100 mL of ethyl acetate. The combined organic extract was dried over $Na_2SO_4$ and then evaporated to dryness. Yield 15.0 g (98%) of a yellow oil. Anal. Calc. for $C_{22}H_{28}BNO_2$: C 75.65; H 8.08; N 4.01. Found: C 75.99; H 8.32; N 3.79. $^1$H NMR (CDCl$_3$): δ 7.59 (m, 1H), 7.18-7.23 (m, 4H), 6.71-6.74 (m, 3H), 5.25 (m, 1H), 3.87 (br.s, 1H, NH), 2.76-2.90 (m, 2H), 2.12-2.16 (m, 1H), 1.75-1.92 (m, 3H), 1.16 (s, 6H), 1.10 (s, 6H).

2-(8-Anilino-5,6,7,8-tetrahydronaphthalen-1-yl)-N-(2,6-diisopropylphenyl)quinolin-8-amine To a solution of 13.8 g (41.0 mmol) of 2-chloro-N-(2,6-diisopropylphenyl)quinolin-8-amine in 700 mL of 1,4-dioxane were added 15.0 g (43.0 mmol) of N-phenyl-8-(4,4,5,5-tetramethyl-1,3,2-dioxaborolan-2-yl)-1,2,3,4-tetrahydronaphthalen-1-amine, 35.0 g (107 mmol) of cesium carbonate and 400 mL of water. The obtained mixture was purged with argon for 10 min followed by an addition of 2.48 g (2.15 mmol) of Pd(PPh$_3$)$_4$. The formed mixture was stirred for 2 hrs. at 90° C., then cooled to 23° C. To the obtained two-phase mixture 700 mL of n-hexane was added. The organic layer was separated, washed with brine, dried over $Na_2SO_4$, and then evaporated to dryness. The residue was purified by flash chromatography on silica gel 60 (40-63 μm, eluent: hexane-ethyl acetate-triethylamine=100:5:1, vol.) and then re-crystallized from 150 mL of n-hexane. Yield 15.1 g (70%) of a yellow powder. Anal. calc. for $C_{37}H_{39}N_3$: C 84.53; H 7.48; N 7.99. Found: C 84.60; H 7.56; N 7.84. $^1$H NMR (CDCl$_3$): δ 7.85-7.87 (d, J=7.98 Hz, 1H), 7.56 (br.s, 1H), 7.43-7.45 (d, J=8.43 Hz, 1H), 7.21-7.38 (m, 6H), 7.12 (t, J=7.77 Hz, 1H), 6.87-6.89 (d, J=7.99 Hz, 1H), 6.74 (t, J=7.99 Hz, 1H), 6.36 (t, J=7.32 Hz, 1H), 6.14-6.21 (m, 3H), 5.35 (br.s, 1H), 3.56 (br.s, 1H), 3.20-3.41 (m, 2H), 2.83-2.99 (m, 2H), 2.10-2.13 (m, 1H), 1.77-1.92 (m, 3H), 1.13-1.32 (m, 12H).

Complex of quinolinyldiamido (QDA) Benzene (50 mL) was added to 2-(8-anilino-5,6,7,8-tetrahydronaphthalen-1-yl)-N-(2,6-diisopropylphenyl)quinolin-8-amine (2.21 g, 4.20 mmol) and Hf(NMe$_2$)$_4$ (1.58 g, 4.45 mmol) to form a clear orange solution. The mixture was heated to reflux for 16 hrs. to form a clear red-orange solution. Most of the volatiles were removed by evaporation under a stream of nitrogen to afford a concentrated red solution (ca. 5 mL) that was warmed to 40° C. Then hexane (30 mL) was added and the mixture was stirred to cause orange crystalline solid to form. This slurry was cooled to −40° C. for 30 min. then the solid was collected by filtration and washed with additional cold hexane (2×10 mL). The resulting quinolinyldiamide hafnium diamide was isolated as an orange solid and dried under reduced pressure (2.90 g, 3.67 mmol, 87.4% yield). This solid was dissolved in toluene (25 mL) and Me$_3$Al (12.8 mL, 25.6 mmol) was added. The mixture was warmed to 40° C. for 1 hr. then evaporated under a stream of nitrogen. The crude product (2.54 g) was about 90% pure by $^1$H NMR spectroscopy. The solid was purified by recrystallization from CH$_2$Cl$_2$-hexanes (20 mL-20 mL) by slow evaporation to give pure product as orange crystals (1.33 g, 43.2% from ligand). The mother liquor was further concentrated for a second crop (0.291 g, 9.5% from ligand). (Solvent: CD$_2$Cl$_2$ (ca. 10 mg sample/mL solvent))(Reference peak=CHDCl$_2$δ5.32 ppm).

Preparation of N-[(6-bromopyridin-2-yl)methyl]-2,6-diisopropylaniline A solution of 85.0 g (457 mmol) of 6-bromopyridine-2-carbaldehyde and 80.9 g (457 mmol) of 2,6-diisopropylaniline in 1000 mL of ethanol was refluxed for 8 hrs. The obtained solution was evaporated to dryness, and the residue was re-crystallized from 200 mL of methanol. In argon atmosphere, to thus obtained 113.5 g (329 mmol) of N-[(1E)-(6-bromopyridin-2-yl)methylene]-2,6-diisopropylaniline were added 33.16 g (526 mmol) of NaBH$_3$CN, 9 mL of acetic acid and 1000 mL of methanol. This mixture was refluxed for 12 h, then cooled to 23° C., poured into 1000 mL of water, and crude product was extracted with 3×200 mL of ethyl acetate. The combined extract was dried over sodium sulfate and evaporated to dryness. The residue was purified by flash chromatography on silica gel 60 (40-63 μm, eluent: hexane-ethyl acetate=10:1, vol.). Yield 104.4 g (66%) of a yellow oil. Anal. calc. for C$_{18}$H$_{23}$BrN$_2$: C, 62.25; H, 6.68; N, 8.07. Found: C, 62.40; H, 6.87; N, 7.90. $^1$H NMR (CDCl$_3$): δ 7.50 (m, 1H, 4-H in Py), 7.38 (m, 1H, 5-H in Py), 7.29 (m, 1H, 3-H in Py), 7.05-7.12 (m, 3H, 3,4,5-H in 2,6-iPr$_2$C$_6$H$_3$), 4.18 (s, 2H, CH$_2$NH), 3.94 (br.s, 1H, NH), 3.33 (sept, J=6.8 Hz, 2H, CHMe2), 1.23 (d, J=6.8 Hz, 12H, CHMe2).

Preparation of 7-bromoindan-1-ol To a mixture of 100 g (746 mmol) of indan-1-ol, 250 mL (1.64 mol) of N,N,N',N'-tetramethylethylenediamine, and 3000 mL of pentane cooled to −20° C., 655 mL (1.64 mol) of 2.5 M nBuLi in hexanes was added. The reaction mixture was then refluxed for 12 hrs. and then cooled to −80° C. Then, 225 mL (1.87 mol) of 1,2-dibromotetrafluoroethane was added, and the resulting mixture was allowed to warm to 23° C. This mixture was stirred for 12 h, and then 100 mL of water was added. The resulting mixture was diluted with 2000 mL of water, and the organic layer was separated. The aqueous layer was extracted with 3×400 mL of toluene. The combined organic extract was dried over Na$_2$SO$_4$ and evaporated to dryness. The residue was distilled using a Kugelrohr apparatus, b.p. 120-140° C./1 mbar. The resulting yellow oil was dissolved in 50 mL of triethylamine, and the obtained solution added dropwise to a stirred solution of 49.0 mL (519 mmol) of acetic anhydride and 4.21 g (34.5 mmol) of 4-(dimethylamino)pyridine in 70 mL of triethylamine. The resulting mixture was stirred for 5 min, then 1000 mL of water was added, and stirring was continued for 12 hrs. Then, the reaction mixture was extracted with 3×200 mL of ethyl acetate. The combined organic extract was washed with aqueous Na$_2$CO$_3$, dried over Na$_2$SO$_4$, and evaporated to dryness. The residue was purified by flash chromatography on silica gel 60 (40-63 μm, eluent: hexane-ethyl acetate=30:1, vol.). The resulting ester was dissolved in 1000 mL of methanol, 50.5 g (900 mmol) of KOH was added, and this mixture was refluxed for 3 hrs. The reaction mixture was then cooled to 23° C. and poured into 4000 mL of water. Crude product was extracted with 3×300 mL of dichloromethane. The combined organic extract was dried over Na$_2$SO$_4$ and evaporated to dryness. Yield 41.3 g (26%) of a white crystalline solid. Anal. Calc for C$_9$H$_9$BrO: C, 50.73; H 4.26. Found: C 50.85; H 4.48. $^1$H NMR (CDCl$_3$): δ 7.34 (d, J=7.6 Hz, 1H, 6-H); 7.19 (d, J=7.4 Hz, 1H, 4-H); 7.12 (dd, J=7.6 Hz, J=7.4 Hz, 1H, 5-H); 5.33 (dd, J=2.6 Hz, J=6.9 Hz, 1H, 1-H), 3.18-3.26 (m, 1H, 3- or 3'-H), 3.09 (m, 2H, 3,3'-H); 2.73 (m, 2H, 2,2'-H).

Preparation of 7-bromoindan-1-one to a solution of 37.9 g (177 mmol) of 7-bromoindan-1-ol in 3500 mL of dichloromethane 194 g (900 mmol) of pyridinium chlorochromate was added. The resulting mixture was stirred at 23° C. for 5 hrs., then passed through a silica gel pad (500 mL), and the elute was evaporated to dryness. Yield 27.6 g (74%) of a white crystalline solid. Anal. Calc for C$_9$H$_7$BrO: C, 51.22; H, 3.34. Found: C, 51.35; H, 3.41. $^1$H NMR (CDCl$_3$): δ 7.51 (m, 1H, 6-H); 7.36-7.42 (m, 2H, 4,5-H); 3.09 (m, 2H, 3,3'-H); 2.73 (m, 2H, 2,2'-H).

Preparation of 7-bromo-N-phenyl-2,3-dihydro-1H-inden-1-amine To a stirred solution of 10.4 g (112 mmol) of aniline in 60 mL of toluene 5.31 g (28.0 mmol) of TiCl$_4$ was added for 30 min at 23° C. in argon atmosphere. The resulting mixture was stirred at 90° C. for 30 min followed by an addition of 6.00 g (28.0 mmol) of 7-bromoindan-1-one. The resulting mixture was stirred for 10 min at 90° C., poured into 500 mL of water, and crude product was extracted with 3×100 mL of ethyl acetate. The organic layer was separated, dried over Na$_2$SO$_4$, and then evaporated to dryness. The residue was crystallized from 10 mL of ethyl acetate at −30° C. The resulting solid was separated and dried in vacuum. After that it was dissolved in 100 mL of methanol, 2.70 g (42.9 mmol) of NaBH$_3$CN and 0.5 mL of glacial acetic acid was added. The resulting mixture was refluxed for 3 hrs. in argon atmosphere. The resulting mixture was cooled to 23° C. and then evaporated to dryness. The residue was diluted with 200 mL of water, and crude product was extracted with 3×50 mL of ethyl acetate. The combined organic extract was dried over Na$_2$SO$_4$ and evaporated to dryness. The residue was purified by flash chromatography on silica gel 60 (40-63 μm, eluent: hexane-ethyl acetate-triethylamine=100:10:1, vol.). Yield 5.50 g (68%) of a yellow oil. Anal. calc. for C$_{15}$H$_{14}$BrN: C, 62.52; H, 4.90; N 4.86. Found: C, 62.37; H, 5.05; N 4.62. $^1$H NMR (CDCl$_3$): δ 7.38 (m, 1H, 6-H in indane); 7.22 (m, 3H, 3,5-H in phenyl and 4-H in indane); 7.15 (m, 1H, 5-H in indane); 6.75 (m, 1H, 4-H in indane); 6.69 (m, 2H, 2,6-H in phenyl); 4.94 (m, 1H, 1-H in indane); 3.82 (br.s, 1H, NH); 3.17-3.26 (m, 1H, 3- or 3'-H in indane); 2.92-2.99 (m, 2H, 3'- or 3-H in indane); 2.22-2.37 (m, 2H, 2,2'-H in indane).

Preparation of N-phenyl-7-(4,4,5,5-tetramethyl-1,3,2-dioxaborolan-2-yl)-2,3-dihydro-1H-inden-1-amine To a solution of 2.50 g (8.70 mmol) of 7-bromo-N-phenyl-2,3-dihydro-1H-inden-1-amine in 50 mL THF 3.50 mL (8.70 mmol) of 2.5 M $^n$BuLi in hexanes was added at −80° C. in argon atmosphere. The reaction mixture was then stirred for 1 hr. at this temperature. Then, 11.1 mL (17.8 mmol) of 1.7 M $^t$BuLi in pentane was added, and the reaction mixture was stirred for 1 hr. Then, 3.23 g (17.4 mmol) of 2-isopropoxy-4,4,5,5-tetramethyl-1,3,2-dioxaborolane was added. Then, the cooling bath was removed, and the resulting mixture was stirred for 1 hr. at 23° C. To the formed mixture 10 mL of water was added, and the resulting mixture was evaporated to dryness. The residue was diluted with 200 mL of water, and the title product was extracted with 3×50 mL of ethyl acetate. The combined organic extract was dried over Na$_2$SO$_4$ and evaporated to dryness. Yield 2.80 g (96%) of a light yellow oil. Anal. calc. For C$_{21}$H$_{26}$BNO$_2$: C 75.24; H 7.82; N 4.18. Found: C 75.40; H 8.09; N 4.02. $^1$H NMR (CDCl$_3$): δ 7.63 (m, 1H, 6-H in indane); 7.37-7.38 (m, 1H, 4-H in indane); 7.27-7.30 (m, 1H, 5-H in indane); 7.18 (m, 2H, 3,5-H in phenyl); 6.65-6.74 (m, 3H, 2,4,6-H in phenyl); 5.20-5.21 (m, 1H, 1-H in indane); 3.09-3.17 (m, 1H, 3- or 3'-H in indane); 2.85-2.92 (m, 1H, 3'- or 3-H in indane); 2.28-2.37 (m, 1H, 2- or 2'-H in indane); 2.13-2.19 (m, 1H, 2'- or 2-H in indane); 1.20 (s, 6-H, 4,5-Me in BPin); 1.12 (s, 6H, 4',5'-Me in BPin).

Preparation of 7-(6-(((2,6-diisopropylphenyl)amino) methyl)pyridin-2-yl)-N-phenyl-2,3-dihydro-1H-inden-1-amine A solution of 2.21 g (21.0 mmol) of Na$_2$CO$_3$ in a mixture of 80 mL of water and 25 mL of methanol was purged with argon for 30 min. The obtained solution was added to a mixture of 2.80 g (8.40 mmol) of N-phenyl-7-(4,4,5,5-tetramethyl-1,3,2-dioxaborolan-2-yl)-2,3-dihydro-1H-inden-1-amine, 2.90 g (8.40 mmol) of N-[(6-bromopyridin-2-yl)methyl]-2,6-diisopropylaniline, 0.48 g (0.40 mmol) of Pd(PPh$_3$)$_4$, and 120 mL of toluene. This mixture was stirred for 12 hrs. (h) at 70° C., then cooled to 23° C. The organic layer was separated, the aqueous layer was extracted with 3×50 mL of ethyl acetate. The combined organic extract was washed with brine, dried over Na$_2$SO$_4$ and evaporated to dryness. The residue was purified by flash chromatography on silica gel 60 (40-63 µm, eluent: hexane-ethyl acetate-triethylamine=100:5:1, vol.). Yield 2.00 g (50%) of a yellow oil. Anal. calc. For C$_{33}$H$_{37}$N$_3$: C 83.33; H 7.84; N 8.83. Found: C 83.49; H 7.66; N 8.65. $^1$H NMR (CDCl$_3$): δ 7.56-7.61 (m, 3H, 6-H in indane and 4.5-H in Py); 7.46-7.51 (m, 2H, 3,5-H in phenyl); 7.14-7.16 (m, 1H, 4-H in indane); 7.08-7.12 (m, 5H, 3-H in Py, 3,4,5-H in 2,6-diisopropylphenyl and 5-H in indane); 6.65 (m, 1H, 4-H in phenyl); 6.53 (m, 2H, 2,6-H in phenyl); 5.21-5.22 (m, 1H, 1-H in indane); 3.95-4.15 (m, 4H, CH$_2$NH and NH-phenyl and NH-2,6-diisopropylphenyl); 3.31 (sept, J=6.8 Hz, 2H, CH in 2,6-diisopropylphenyl); 3.16-3.24 (m, 1H, 3- or 3'-H in indane); 2.91-2.97 (m, 1H, 3'- or 3-H in indane); 2.21-2.37 (m, 2H, 2,2'-H in indane); 1.19-2.21 (m, 12H, CH$_3$ in 2,6-diisopropylaniline).

Preparation of pyridyldiamide catalyst precursor (PDA) Toluene (5 mL) was added to 7-(6-(((2,6-diisopropylphenyl) amino)methyl)pyridin-2-yl)-N-phenyl-2,3-dihydro-1H-inden-1-amine (0.296 g, 0.623 mmol) and Hf(NMe$_2$)$_2$Cl$_2$ (dme) (0.267 g, 0.623 mmol) to form a clear colorless solution. The mixture was loosely capped with aluminum foil and heated to 95° C. for 3 hrs. The mixture was then evaporated to a solid and washed with Et$_2$O (5 mL) to afford 0.432 g of the presumed (pyridyldiamide) HfCl$_{12}$ complex. This was dissolved in CH$_2$Cl$_2$ (5 mL) and cooled to –50° C. An Et$_2$O solution of dimethylmagnesium (3.39 mL, 0.747 mmol) was added dropwise and the mixture was allowed to warm to ambient temperature. After 30 min. the volatiles were removed by evaporation and the residue was extracted with CH$_2$Cl$_2$ (10 mL) and filtered. The solution was concentrated to 2 mL and pentane (4 mL) was added. Cooling to –10° C. overnight afforded colorless crystals that were isolated and dried under reduced pressure. Yield=0.41 g, 92%. $^1$H NMR (CD$_2$Cl$_2$, 400 MHz): 8.00 (t, 1H), 6.85-7.65 (13H), 5.06 (d, 1H), 4.91 (dd, 1H), 4.50 (d, 1H), 3.68 (sept, 1H), 3.41 (m, 1H), 2.85 (m, 1H), 2.61 (sept, 1H), 2.03 (m, 1H), 1.85 (m, 1H), 1.30 (m, 2H), 1.14 (d, 3H), 1.06 (d, 3H), 0.96 (d, 3H), 0.68 (3, 3H), –0.48 (s, 3H), –0.84 (s, 3H).

Polymerization In particular, all examples were produced using a solution polymerization process in a 1.0-liter continuous stirred-tank reactor (autoclave reactor). The autoclave reactor was equipped with a stirrer, a water-cooling/ steam-heating element with a temperature controller, and a pressure controller. Solvents and monomers were purified by passing through purification columns packed with mol sieves. Isohexane (solvent) was passed through four columns in series whereas ethylene, propylene, and toluene were each purified by passing through two columns in series. Purification columns are regenerated periodically (about twice/year) or whenever there is evidence of low catalyst activity. 5-ethylidene-2-norbornene (ENB) was purified in a glove box by passing through a bed of basic alumina under a steady nitrogen gas purge. 5-vinyl-2-norbornene (VNB) was purified by stirring the diene with sodium-potassium alloy (NaK) then filtering through a bed of basic or neutral alumina. Tri-n-octylaluminum (TNOAL, available from Sigma Aldrich, Milwaukee, Wis.) solution was diluted to a concentration of $1.84 \times 10^{-6}$ using isohexane.

Catalyst used for examples 1-12 was the PDA catalyst described above (MW 720.0 g/mol). The activator used was N,N-dimethylanilinium tetrakis(pentafluorophenyl) borate. Catalyst solution was prepared daily and used on the same day. The solution was prepared by dissolving 40.0 mg of the catalyst and 45.4 to 47.9 mg of the activator in 450 mL toluene (catalyst concentration=1.24 to $1.30 \times 10^{-07}$ mol/mL, catalyst/activator (molar ratio) about 0.98). This solution was pumped into the reactor through a designated dip-tube at a desired rate using an Isco pump.

The PDA catalyst precursor was fed at a rate of $9.26 \times 10^{-8}$ mol/min for samples 1-6; and $9.77 \times 10^{-8}$ mol/min for samples 7-12; and activator was fed at a rate of $9.45 \times 10^{-8}$ mol/min for samples 1-6; and $9.97 \times 10^{-8}$ mol/min for samples 7-12. TNOAL was fed at a rate of $7.37 \times 10^{-6}$ mol/min.

For examples 13-20, the catalyst used was the QDA catalyst described above (732.2 g/mol). The QDA catalyst precursor was fed at a rate of $1.82 \times 10^{-7}$ mol/min; and the activator (N,N-dimethylanilinium tetrakis(pentafluorophenyl) borate) was fed at a rate of $1.86 \times 10^{-7}$ mol/min. TNOAL was fed at a rate of $7.37 \times 10^{-6}$ mol/min.

Composition was controlled by adjusting the feed ratio of the monomers. Ethylene and propylene feed rates were held constant for all examples listed in Table 1 while the diene feed rate was varied. No hydrogen was added. All the reactions were carried out at a gauge pressure of about 2.2 MPa and a temperature of 110° C. The collected samples were first placed on a boiling-water steam table in a hood to evaporate a large fraction of the solvent and unreacted monomers, and then, dried in a vacuum oven at a temperature of about 90° C. for about 12 hours. The vacuum oven dried samples were weighed to obtain yields. Ethylene, ENB, and VNB (VNB incorporated only through the endo-cyclic double bond) content of the polymers were determined by FTIR (ASTM D3900, ASTM D6047). Monomer conversions were calculated using the polymer yield, composition and the amount of monomers fed into the reactor. Catalyst activity (also referred as to catalyst productivity) was calculated based upon the yield and the feed rate of catalyst. Mooney measurements were made to gauge molecular weight and long-chain branching of the EPDM terpolymers. Samples were later analyzed using GPC as described below to determine the molecular weight distribution as well as g' values.

In Table 1, the reactor conditions for polymerization are set forth, and additionally include a reactor temperature of 110° C.; reactor pressure of 320 psig; where the activator was N,N-dimethylanilinium tetrakis(pentafluorophenyl)borate; the catalyst feed was $9.2$-$9.8 \times 10^{-8}$ mol/min for PDA and $1.8 \times 10^{-7}$ for QDA; an tri-n-octylaluminum feed was $7.4 \times 10^{-6}$ mol/min; and an isohexane feed of 60-65 g/min.

TABLE 1

Reactor Conditions for polymerization

| | | Reactor Input | | | | | FT-IR data | | |
|---|---|---|---|---|---|---|---|---|---|
| Sample | Catalyst | Ethylene Feed (g/min) | Propylene Feed (g/min) | ENB Feed (g/min) | VNB Feed (g/min) | H$_2$ (SCCM) | Ethylene (wt %) uncorrected | ENB (wt %) | VNB (wt %) |
| 1  | PDA | 2.0 | 8.0 | —    | 0.00 | —   | 51.1% | —    | —    |
| 2  | PDA | 2.0 | 8.0 | —    | 0.03 | —   | 57.2% | —    | 0.1% |
| 3  | PDA | 2.0 | 8.0 | —    | 0.04 | —   | 58.4% | —    | 0.2% |
| 4  | PDA | 2.0 | 8.0 | —    | 0.00 | —   | 56.6% | —    | 0.0% |
| 5  | PDA | 2.0 | 8.0 | —    | 0.03 | —   | 64.5% | —    | 0.1% |
| 6  | PDA | 2.0 | 8.0 | —    | 0.04 | —   | 63.6% | —    | 0.2% |
| 7  | PDA | 2.0 | 8.0 | 0.00 | —    | —   | 45.2% | —    | —    |
| 8  | PDA | 2.0 | 8.0 | 0.04 | —    | —   | 54.4% | 0.8% | —    |
| 9  | PDA | 2.0 | 8.0 | —    | 0.00 | —   | 48.2% | —    | —    |
| 10 | PDA | 2.0 | 8.0 | —    | 0.04 | —   | 58.3% | —    | 0.2% |
| 11 | PDA | 2.0 | 8.0 | —    | 0.07 | —   | 64.3% | —    | 0.4% |
| 12 | PDA | 2.0 | 8.0 | —    | 0.11 | —   | 65.0% | —    | 0.6% |
| 13 | QDA | 2.5 | 5.0 | 0.04 | —    | —   | 41.6% | 0.6% | —    |
| 14 | QDA | 2.5 | 5.0 | 0.04 | —    | 2.0 | 43.9% | 0.5% | —    |
| 15 | QDA | 2.5 | 5.0 | 0.07 | —    | 2.0 | 49.3% | 0.8% | —    |
| 16 | QDA | 2.5 | 5.0 | 0.11 | —    | 2.0 | 57.0% | 1.0% | —    |
| 17 | QDA | 2.5 | 5.0 | 0.14 | —    | 2.0 | 58.0% | 1.3% | —    |
| 18 | QDA | 2.5 | 5.0 | —    | 0.04 | 2.0 | 48.1% | —    | 0.2% |
| 19 | QDA | 2.5 | 5.0 | —    | 0.07 | 2.0 | 55.0% | —    | 0.4% |
| 20 | QDA | 2.5 | 5.0 | —    | 0.11 | 2.0 | 55.3% | —    | 0.7% |

TABLE 2

Polymer Collection and Mooney Data

| Sample | ML | MLRA | Sample quantity (g) | Collection Time (min) | Cat Efficiency (g poly/g cat) |
|---|---|---|---|---|---|
| 1  | —    | —     | 37.3 | 15 | 37300 |
| 2  | —    | —     | 24.5 | 15 | 24500 |
| 3  | —    | —     | 20.7 | 15 | 20700 |
| 4  | —    | —     | 29.4 | 15 | 29400 |
| 5  | —    | —     | 24.0 | 20 | 18000 |
| 6  | —    | —     | 39.3 | 30 | 19650 |
| 7  | 56.1 | 48.9  | 31.5 | 10 | 47250 |
| 8  | 53.0 | 55.7  | 69.1 | 30 | 34550 |
| 9  | 32.5 | 55.2  | 28.6 | 10 | 42900 |
| 10 | 23.1 | 50.8  | 44.2 | 30 | 22100 |
| 11 | 20.8 | 62.9  | 33.5 | 30 | 16750 |
| 12 | 16.6 | 77.1  | 26.1 | 30 | 13050 |
| 13 | 70.5 | 159.9 | 78.0 | 20 | 29250 |
| 14 | 42.3 | 60.9  | 66.5 | 15 | 33250 |
| 15 | 54.8 | 58.7  | 58.1 | 15 | 29050 |
| 16 | 64.9 | 85.7  | 44.1 | 15 | 22050 |
| 17 | 54.1 | 59.4  | 53.5 | 20 | 20063 |
| 18 | 48.9 | 250.8 | 59.3 | 15 | 29650 |
| 19 | 53.9 | 339.6 | 48.2 | 15 | 24100 |
| 20 | 27.2 | 154.7 | 45.6 | 15 | 22800 |

TABLE 3

Gel Permeation Chromatography Data

| Sample | Mn (LS), kg/mol | Mw (LS), kg/mol | g'$_{Avg}$ | g'$_{1000}$ | wt % C2 units |
|---|---|---|---|---|---|
| 1  | 64  | 131 | 1.032 | —     | 51.09 |
| 2  | 51  | 121 | 0.999 | 0.860 | 60.99 |
| 3  | 48  | 120 | 0.981 | 0.823 | 62.67 |
| 4  | 64  | 128 | 1.021 | —     | 57.75 |
| 5  | 47  | 104 | 0.995 | 0.785 | 64.46 |
| 6  | 48  | 118 | 0.990 | 0.810 | 63.29 |
| 7  | 105 | 220 | 1.029 | —     | 42.85 |
| 8  | 87  | 197 | 0.990 | 0.870 | 52.87 |
| 9  | 83  | 175 | 1.028 | —     | 46.00 |
| 10 | 54  | 142 | 0.992 | 0.881 | 60.44 |
| 11 | 42  | 145 | 0.934 | 0.758 | 63.85 |
| 12 | 41  | 145 | 0.781 | 0.686 | 65.99 |
| 13 | 130 | 258 | 1.029 | 1.009 | 40.29 |
| 14 | 96  | 193 | 1.021 | 1.057 | 43.73 |
| 15 | 102 | 201 | 1.039 | 1.048 | 49.39 |
| 16 | 108 | 207 | 1.032 | 0.912 | 57.91 |
| 17 | 96  | 188 | 1.027 | 0.897 | 59.39 |
| 18 | 82  | 230 | 0.906 | 0.746 | 47.95 |
| 19 | 75  | 222 | 0.874 | 0.709 | 55.36 |
| 20 | 52  | 165 | 0.826 | 0.602 | 56.20 |

IR Spectrometry Total ethylene content of the elastomers was determined using a Nicolet 6700 FTIR (ASTM D3900, ASTM D6047). The granular elastomers from the reactor was first extruded and pelletized. Pellet samples were compression molded into a 10 mil thick pad. The pressed pad was placed in the instrument such that the IR beam passes through the pad and then measures the remaining signal on the other side. Methyl groups from the propylene affect the absorption, so the machine was calibrated to a range of ethylene content.

Mooney Viscosity and Mooney Relaxation Area Mooney viscosity is a property used to monitor the quality of both natural and synthetic rubbers. It measures the resistance of rubber to flow at a relatively low shear rate. The highly branched polymers have a Mooney viscosity ML (1+4) at 125° C. of 30 to 100 MU (preferably 40 to 80, preferably 45 to 70, preferably 50 to 65), where MU is Mooney Units.

While the Mooney viscosity indicates the plasticity of the rubber, the Mooney relaxation area (MLRA) provides a certain indication of the effects of molecular weight distribution and elasticity of the rubber. The highly branched compositions also have a MLRA of 30 to 100 MU (preferably 40 to 80, preferably 45 to 70).

Another indication of melt elasticity is the ratio of MLRA/ML (1+4). This ratio has the dimension of time and can be considered as a "relaxation time." A higher number signifies a higher degree of melt elasticity. Long chain branching will slow down the relaxation of the polymer chain, hence increasing the value of MLRA/ML (1+4). In the present compositions, the MLRA/ML is 1 or less, and as low as 0.9, or 0.8.

Mooney viscosity and Mooney relaxation area are measured using a Mooney viscometer, operated at an average shear rate of about 2 s$^{-1}$ according to the following modified ASTM D1646: A square of sample is placed on either side of the rotor. The cavity is filled by pneumatically lowering the upper platen. The upper and lower platens are electrically heated and controlled at 125° C. The torque to turn the rotor at 2 rpm is measured by a torque transducer. The sample is preheated for 1 min. after the platens was closed. The motor is then started and the torque is recorded for a period of 4 min. Results are reported as ML (1+4) at 125° C., where M is Mooney viscosity number, L denotes the large rotor, "1" is the sample preheat time in min., "4" is the sample run time in min. after the motor starts, and 125° C. is the test temperature.

The MLRA data is obtained from the Mooney viscosity measurement when the rubber relaxed after the rotor is stopped. The MLRA is the integrated area under the Mooney torque-relaxation time curve from 1 to 100 secs. The MLRA can be regarded as a stored energy term which suggests that, after the removal of an applied strain, the longer or branched polymer chains can store more energy and require longer time to relax. Therefore, the MLRA value of a bimodal rubber (the presence of a discrete polymeric fraction with very high molecular weight and distinct composition) or a long chain branched rubber are larger than a broad or a narrow molecular weight rubber when compared at the same Mooney viscosity values.

Mooney viscosity values greater than about 100 cannot generally be measured using ML (1+4) at 125° C. In this event, a higher temperature is used (e.g., 150° C.), with eventual longer shearing time (i.e., 1+8 at 125° C. or 150° C.), but more preferably, the Mooney measurement is carried out using a non-standard small rotor as described below. The non-standard rotor design is employed with a change in Mooney scale that allows the same instrumentation on the Mooney machine to be used with higher Mooney rubbers. This rotor is termed MST, Mooney Small Thin, in contrast with ML.

Molecular Weight Determinations The distribution and the moments of molecular weight (Mw, Mn, Mz, and Mw/Mn) in Table 1 were determined by using a high temperature Gel Permeation Chromatography (Polymer Char GPC-IR) equipped with a multiple-channel band-filter based Infrared detector IR5, an 18-angle light scattering detector and a viscometer (not used here). The GPC trace and mass balance traces are for Sample 3 are shown in FIG. 1. Three Agilent PLgel 10 μm Mixed-B LS columns were used to provide polyolefin separation through size exclusion. Aldrich reagent grade 1,2,4-trichlorobenzene (TCB) with 300 ppm of the antioxidant butylated hydroxytoluene was used as the mobile phase. The TCB mixture was filtered through a 0.1 μm polytetrafluoroethylene filter and degassed with an online degasser before entering the GPC instrument. The nominal flow rate was 1.0 mL/min and the nominal injection volume was 200 μL. The whole system including transfer lines, columns, detectors were contained in an oven maintained at 145° C. A given amount of polyolefin sample was weighed and sealed in a standard vial with 80 μL flow marker (heptane) added to it. After loading the vial in the auto-sampler, polyolefin was automatically dissolved in the instrument with 8 mL added TCB solvent. The polyolefin was dissolved at 160° C. with continuous shaking for about 1 hr. for most polyethylene samples or 2 hrs. for polypropylene samples. The TCB densities used in concentration calculation were 1.463 g/mL at 23° C. and 1.284 g/mL at 145° C. The sample solution concentration was from 0.2 to 2.0 mg/mL, with lower concentrations being used for higher molecular weight samples.

The concentration "c" at each point in the chromatogram was calculated from the baseline-subtracted IR5 broadband signal intensity "I" using the following equation:

$$c = \beta I,$$

where β is the mass constant determined with polyethylene or polypropylene standards. The mass recovery was calculated from the ratio of the integrated area of the concentration chromatography over elution volume and the injection mass which is equal to the pre-determined concentration multiplied by injection loop volume.

The conventional molecular weight (IR molecular weight "M") was determined by combining universal calibration relationship with the column calibration which was performed with a series of mono-dispersed polystyrene (PS) standards ranging from 700 g/mole to 10,000,000 g/mole. The molecular weight "M" at each elution volume was calculated with following equation:

$$\log M = \frac{\log(K_{PS}/K)}{a+1} + \frac{a_{PS}+1}{a+1} \log M_{PS},$$

where the variables with subscript "PS" stands for "polystyrene" while those without a subscript are for the test samples. In this method, $a_{PS}=0.67$ and $K_{PS}=0.000175$ while "a" and "K" are calculated from a series of empirical formula established in the literature (T. Sun, P. Brant, R. R. Chance, and W. W. Graessley, 34(19) MACROMOLECULES 6812-6820 (2001)). Specifically, the value of a/K is 0.695/0.000579 for polyethylene and 0.705/0.0002288 for polypropylene. Molecular weight is expressed in g/mole or kg/mole. The values for Mw are determined ±500 g/mole, and for Mn±100 g/mole.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR such as an ExxonMobil Chemical Company commercial grade of LLDPE, polypropylene, etc.

The LS detector is the 18-angle Wyatt Technology High Temperature Dawn Heleosii™. The LS molecular weight "M" at each point in the chromatogram is determined by analyzing the LS output using the Zimm model for static light scattering (W. Burchard & W. Ritchering, "Dynamic Light Scattering from Polymer Solutions," in 80 PROGRESS IN COLLOID & POLYMER SCIENCE, 151-163 (Steinkopff, 1989)):

$$\frac{K_o c}{\Delta R(\theta)} = \frac{1}{MP(\theta)} + 2A_2 c,$$

here, ΔR(θ) is the measured excess Rayleigh scattering intensity at scattering angle θ, "c" is the polymer concentration determined from the infrared analysis, $A_2$ is the second virial coefficient. P(θ) is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm.

A high temperature Agilent (or Viscotek Corporation) viscometer, which has four capillaries arranged in a Wheatstone bridge configuration with two pressure transducers, is used to determine specific viscosity and branching. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$[\eta] = \eta_s / c,$$

where c is concentration and was determined from the infrared (IR5) broadband channel output. The viscosity "M" at each point is calculated from the below equation:

$$M = K_{PS} M^{\alpha PS + 1} / [\eta].$$

The branching index ($g'_{avg}$) is calculated using the output of the GPC-IR5-LS-VIS method as follows. The average intrinsic viscosity, $[\eta_{avg}]$, of the sample is calculated by:

$$[\eta]_{avg} = \frac{\sum c_i [\eta]_i}{\sum c_i},$$

where the summations are over the chromatographic slices, "i", between the integration limits. The branching index $g'_{avg}$ is defined as:

$$g'_{avg} = \frac{[\eta]_{avg}}{kM_v^\alpha}.$$

The $M_v$ is the viscosity-average molecular weight based on molecular weights determined by LS analysis. Also, as used herein the $g'_{1000}$ is the value of g' at a molecular weight of 1,000,000 g/mole, thus a measure of the amount of branching on the high molecular weight component of the polymer. Branching data for inventive Sample 3 is shown in FIG. 1.

Phase Angle Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 min. before inserting compression-molded sample of resin onto the parallel plates. To determine the samples viscoelastic behavior, frequency sweeps in the range from 0.01 to 385 rad/s were carried out at a temperature of 190° C. under constant strain. Depending on the molecular weight and temperature, strains of 10% and 15% were used and linearity of the response was verified. A nitrogen stream was circulated through the sample oven to minimize chain extension or cross-linking during the experiments. All the samples were compression molded at 190° C. and no stabilizers were added. A sinusoidal shear strain is applied to the material. If the strain amplitude is sufficiently small the material behaves linearly. It can be shown that the resulting steady-state stress will also oscillate sinusoidally at the same frequency but will be shifted by a phase angle Δ with respect to the strain wave. The stress leads the strain by Δ. For purely elastic materials Δ=0° (stress is in phase with strain) and for purely viscous materials, Δ=90° (stress leads the strain by 90° although the stress is in phase with the strain rate). For viscoelastic materials, 0<Δ<90. The shear thinning slope (STS) was measured using plots of the logarithm (base ten) of the dynamic viscosity versus logarithm (base ten) of the frequency. The slope is the difference in the log(dynamic viscosity) at a frequency of 100 s$^{-1}$ and the log(dynamic viscosity) at a frequency of 0.01 s$^{-1}$ divided by 4. Dynamic viscosity is also referred to as complex viscosity or dynamic shear viscosity.

Figure 2A:
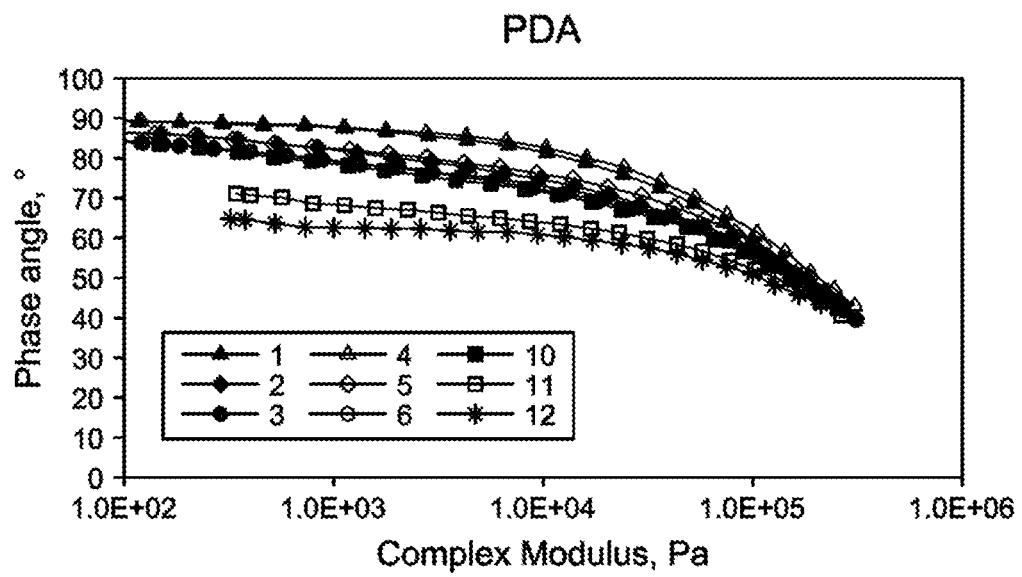
FIG. 2a is a plot of phase angle versus complex modulus for the inventive branched ethylene-α-olefin diene elastomer from the PDA catalyst.
Figure 2B:
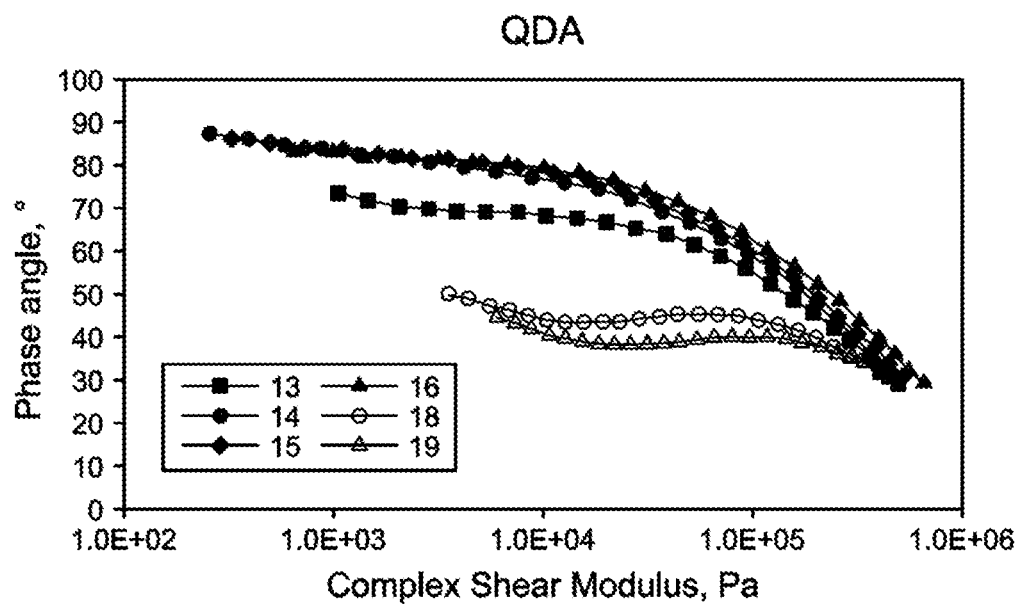
FIG. 2b is a plot of phase angle versus complex modulus for the inventive branched ethylene-α-olefin diene elastomer from the QDA catalyst.

Rheological data may be presented by plotting the phase angle versus the absolute value of the complex modulus (G*) to produce a van Gurp-Palmen plot. The plot of conventional polyethylene polymers shows monotonic behavior and a negative slope toward higher G* values. Conventional LLDPE polymer without long chain branches exhibit a negative slope on the van Gurp-Palmen plot. For branched modifiers, the phase angels shift to a lower value as compared with the phase angle of a conventional ethylene polymer without long chain branches at the same value of G*. The van Gurp-Palmen plots of some embodiments of the branched modifier polymers described in the present disclosure exhibit two slopes—a positive slope at lower G* values and a negative slope at higher G* values. Such a plot is presented in FIG. 2a and FIG. 2b.

Sentmanat Extensional Rheology Extensional Rheometry was performed on an Anton-Paar MCR 501 or TA Instruments DHR-3 using a SER Universal Testing Platform (Xpansion Instruments, LLC), model SER2-P or SER3-G. The SER (Sentmanat Extensional Rheometer) Testing Platform is described in U.S. Pat. Nos. 6,578,413 and 6,691,569. A general description of transient uniaxial extensional viscosity measurements is provided, for example, in "Strain hardening of various polyolefins in uniaxial elongational flow," 47(3) THE SOCIETY OF RHEOLOGY, INC., J. RHEOL., 619-630 (2003); and "Measuring the transient extensional rheology of polyethylene melts using the SER universal testing platform," 49(3) THE SOCIETY OF RHEOLOGY, INC., J. RHEOL., 585-606 (2005). Strain hardening occurs when a polymer is subjected to uniaxial extension and the transient extensional viscosity increases more than what is predicted from linear viscoelastic theory. Strain hardening is observed as abrupt upswing of the extensional viscosity in the transient extensional viscosity versus time plot. A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1. The SER instrument consists of paired master and slave windup drums mounted on bearings housed within a chassis and mechanically coupled via intermeshing gears. Rotation of the drive shaft results in a rotation of the affixed master drum and an equal but opposite rotation of the slave drum which causes the ends of the polymer sample to be sound up onto the drums resulting in the sample stretched. The sample is mounted to the drums via securing clamps in most cases. In addition to the extensional test, samples are also tested using transient steady shear conditions and matched to the extensional data using a correlation factor of three. This provides the linear viscoelastic envelope (LVE). Rectangular sample specimens with dimensions approximately 18.0 mm long×

Figure 3:
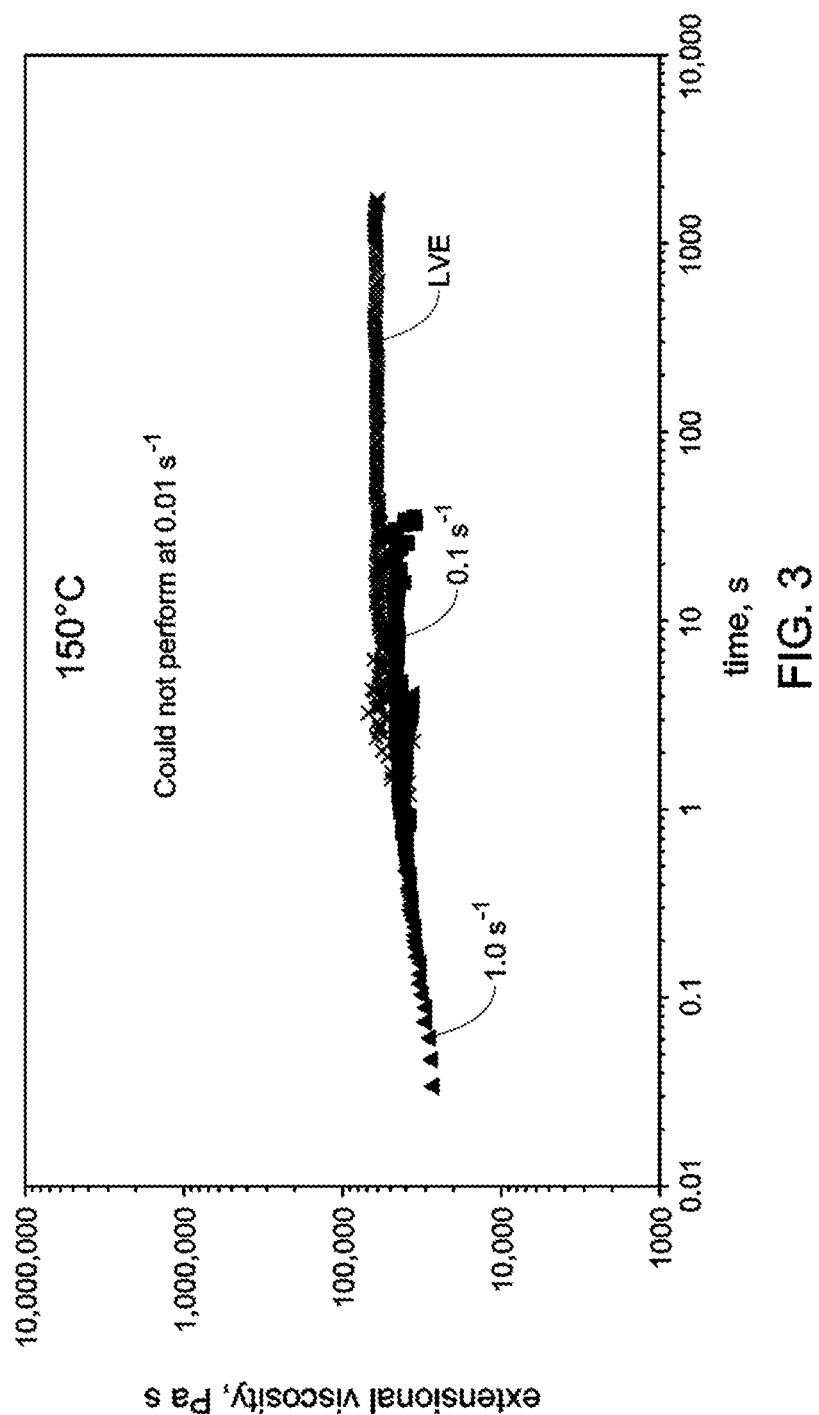
FIG. 3 is an extensional viscosity trace at various rates for Sample 1 elastomer (no VNB) at 150° C.
Figure 4:
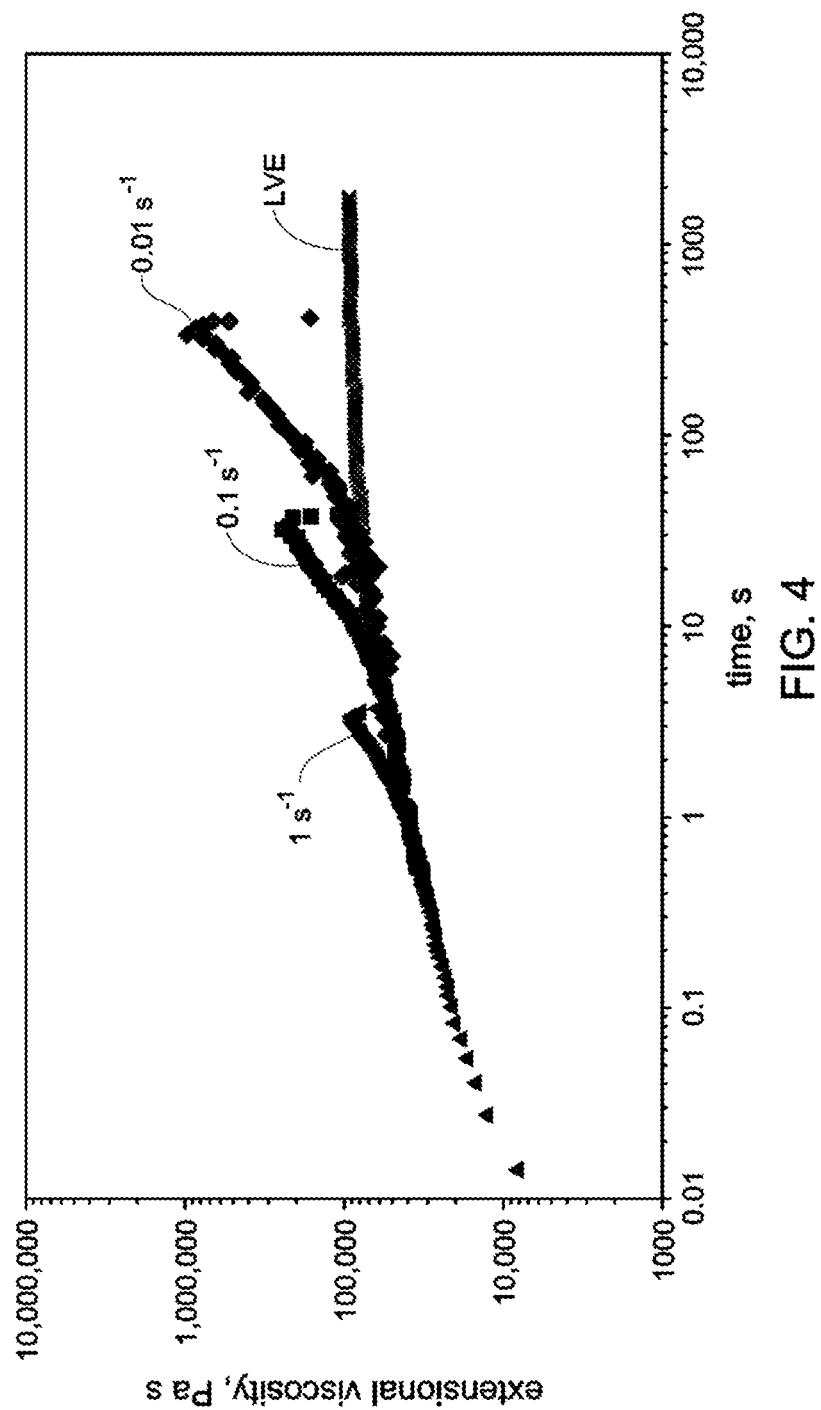
FIG. 4 is an extensional viscosity trace at various rates for the inventive branched ethylene-α-olefin diene elastomer (0.2 wt % VNB) of Sample 3.

12.70 mm wide are mounted on the SER fixture. Samples are generally tested at three Hencky strain rates: $0.01\ s^{-1}$, $0.1\ s^{-1}$ and $1\ s^{-1}$. The testing temperature is 150° C. The polymer samples were prepared as follows: the sample specimens were hot pressed at 190° C., mounted to the fixture, and equilibrated at 150° C. Such plots are presented in FIG. 3 for a comparative elastomer and FIG. 4 for an inventive Sample 3 elastomer.

With respect to a composition or polyolefin, "consisting essentially of" means that the claimed polyolefin, composition and/or article includes the named components and no additional components that will alter its measured properties by any more than ±1, 2, 5, or 10%, and most preferably means that "additives" are present, if at all, to a level of less than 5, or 4, or 3, or 2 wt % by weight of the composition. Such additional additives can include, for example, inorganic fillers (such as talc, glass, and other minerals), carbon black, nucleators, clarifiers, colorants (soluble and insoluble), foaming agents, antioxidants, alkyl-radical scavengers (preferably vitamin E or other tocopherols and/or tocotrienols), anti-ultraviolet light agents, acid scavengers, curatives and cross-linking agents, mineral and synthetic oils, aliphatic and/or cyclic containing oligomers or polymers (and other "hydrocarbon resins"), and other additives well known in the art.

With respect to a process or apparatus, the phrase "consisting essentially of" means that the claimed process does not include any other process steps (or apparatus features/means) that change the nature of the overall claimed process, such as an additional polymerization step, or additional olefin/polyolefin separation step, or additional re-directing of polymerization medium flow, heating, cooling, pressurizing, and/or depressurizing that impart a change in the final polyolefin product by any more than ±1, 2, or 5% from a measured chemical properties.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A process to produce a branched ethylene-α-olefin diene elastomer (b-EDE) comprising combining a catalyst precursor and an activator with a feed comprising ethylene, $C_3$ to $C_{12}$ α-olefins, and a dual-polymerizable diene to obtain a b-EDE; where the catalyst precursor is selected from pyridyldiamide and quinolinyldiamido transition metal complexes, wherein the pyridyldiamido and quinolinyldiamido transition metal complexes are selected from one of the following structures:

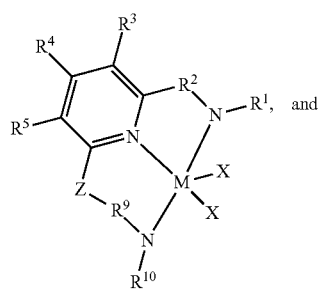

and

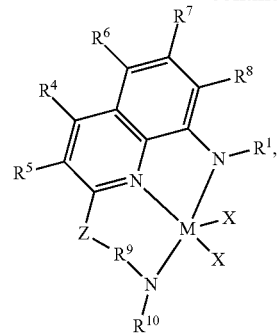

wherein M is titanium, hafnium or zirconium;
$R^1$ and $R^{10}$ are independently selected from the group consisting of hydrocarbyls, substituted hydrocarbyls, heterohydrocarbyls, and silyl groups;
$R^2$ and $R^9$ are each, independently, divalent hydrocarbyls or a chemical bond;
$R^3$, $R^4$, $R^5$, $R^6$, $R^7$, and $R^8$ are independently selected from the group consisting of hydrogen, hydrocarbyls, substituted hydrocarbyls, alkoxy, aryloxy, halogen, amino, and silyl, and wherein adjacent R groups may be joined to form a substituted or unsubstituted hydrocarbyl or heterocyclic ring, where the ring has 5, 6, 7, or 8 ring atoms and where substitutions on the ring can join to form additional rings;
X is an anionic leaving group, where the X groups may be the same or different and any two X groups may be linked to form a dianionic leaving group; and
Z is $—(R^{11})_p QJ(R^{12})_q—$, wherein Q is carbon, oxygen, nitrogen, or silicon, and where J is carbon or silicon, p is 1 or 2; and q is 1 or 2; and $R^{11}$ and $R^{12}$ are independently selected from the group consisting of hydrogen, hydrocarbyls, and substituted hydrocarbyls, and wherein adjacent $R^{11}$ and $R^{12}$ groups may be joined to form an aromatic or saturated, substituted or unsubstituted hydrocarbyl ring, where the ring has 5, 6, 7, or 8 ring carbon atoms and where substitutions on the ring can join to form additional rings.

2. The process of claim 1, combining at a temperature within a range from 80° C. to 160° C. and a pressure within a range from 0.5 MPa to 8 MPa.

3. The process of claim 1, combining in a solution process.

4. The process of claim 1, also combining a singly-polymerizable diene.

5. The process of claim 1, wherein the α-olefins comprise propylene.

6. The process of claim 1, wherein hydrogen is present to less than 5 sccm (standard cubic centimeter per min.).

7. The process of claim 4, wherein the b-EDE comprises within a range from 40 to 80 wt % of ethylene-derived units by weight of the b-EDE, 0.05 to 2 wt % of the dual-polymerizable diene derived units by weight of the b-EDE, and 0 to 15 wt % of the singly-polymerizable diene derived units by weight of the b-EDE, the remainder comprising $C_3$ to $C_{12}$ α-olefin derived units.

8. The process of claim 1, wherein the b-EDE has a weight average molecular weight (Mw) within a range from 100 kg/mole to 750 kg/mole.

9. The process of claim 1, wherein the b-EDE has a $g'_{avg}$ of 0.9 or more, and a $g'_{1000}$ of less than 0.9.

10. A process to produce a branched ethylene-α-olefin diene elastomer (b-EDE) comprising combining a catalyst precursor and an activator with a feed comprising ethylene, C₃ to C₁₂ α-olefins, and a dual-polymerizable diene to obtain a b-EDE; where the catalyst precursor is selected from pyridyldiamide and quinolinyldiamido transition metal complexes, wherein the catalyst precursor is a transition metal complex selected from one of the following structures:

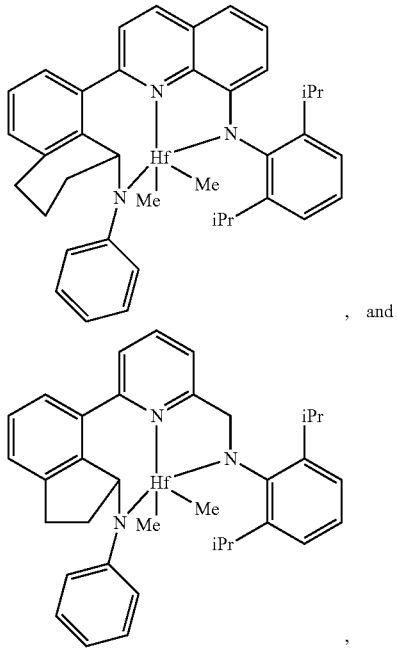

, and

, wherein the "Me" represents methyl and "iPr" represents iso-propyl.

11. A process to produce a branched ethylene-α-olefin diene elastomer (b-EDE) comprising combining a catalyst precursor and an activator with a feed comprising ethylene, C₃ to C₁₂ α-olefins, and a dual-polymerizable diene to obtain a b-EDE; where the catalyst precursor is selected from pyridyldiamide and quinolinyldiamido transition metal complexes, wherein the catalyst precursor is a transition metal complex selected from one of the following structures:

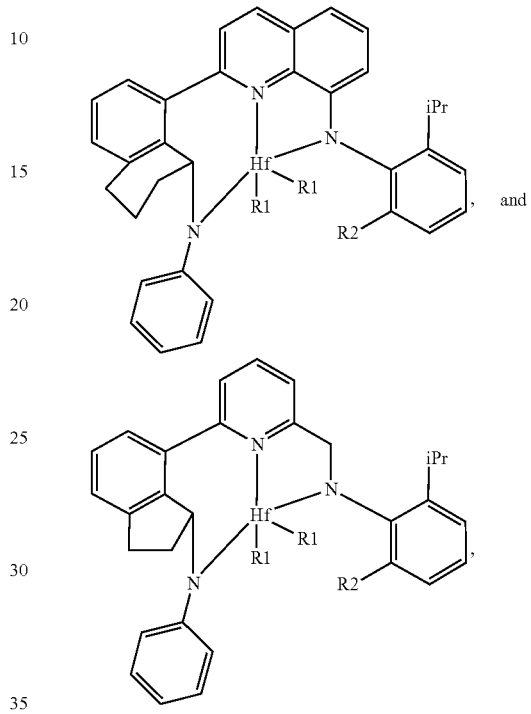

, and

, wherein the R1 and R2 are any C₁ to C₁₀ alkyl (normal, iso, and/or tertiary).

* * * * *